US011245109B2

(12) United States Patent
Tzeng et al.

(10) Patent No.: US 11,245,109 B2
(45) Date of Patent: Feb. 8, 2022

(54) COMPOSITE ELECTRODE MATERIAL AND METHOD FOR MANUFACTURING THE SAME, COMPOSITE ELECTRODE CONTAINING SAID COMPOSITE ELECTRODE MATERIAL, AND LI-BASED BATTERY COMPRISING SAID COMPOSITE ELECTRODE

(71) Applicant: National Cheng Kung University, Tainan (TW)

(72) Inventors: Yon-Hua Tzeng, Tainan (TW); Yen-Ting Pan, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 293 days.

(21) Appl. No.: 15/831,424

(22) Filed: Dec. 5, 2017

(65) Prior Publication Data
US 2019/0088937 A1    Mar. 21, 2019

(30) Foreign Application Priority Data

Sep. 19, 2017    (TW) .................................. 106132042

(51) Int. Cl.
*H01M 4/36*    (2006.01)
*H01M 4/62*    (2006.01)
(Continued)

(52) U.S. Cl.
CPC .......... *H01M 4/366* (2013.01); *C01B 32/186* (2017.08); *C01B 33/02* (2013.01); *H01M 4/134* (2013.01);
(Continued)

(58) Field of Classification Search
None
See application file for complete search history.

(56) References Cited

U.S. PATENT DOCUMENTS 5,631,106 A * 5/1997 Dahn ...................... H01M 4/58
423/594.15
2012/0227252 A1* 9/2012 Nazri .................... H01M 4/136
29/623.1
(Continued)

FOREIGN PATENT DOCUMENTS

CN    103193220 A  *  7/2013
TW    I569499 B       2/2017

OTHER PUBLICATIONS

Tzeng et al. ("Nitrogen-incorporated Ultrananocrystalline Diamond and Graphene Nanowalls Coated Graphite and Silicon Anodes for Long-life Lithium Ion Batteries" Proceedings of the 16th International Conference on Nanotechnology, Sendai, Japan, Aug. 22-25, 2016 (Year: 2016).*

(Continued)

*Primary Examiner* — Magali P Slawski
(74) *Attorney, Agent, or Firm* — Bacon & Thomas, PLLC

(57) ABSTRACT

A novel composite electrode material and a method for manufacturing the same, a composite electrode containing said composite electrode material, and a Li-based battery comprising said composite electrode are disclosed. Herein, (Continued)

the composite electrode material of the present invention comprises: a core, wherein a material of the core is at least one selected from the group consisting of Sn, Sb, Si, Ge, and compounds thereof; and a graphene nanowall or a graphene-like carbon nanowall; wherein the graphene nanowall or the graphene-like carbon nanowall grows on a surface of the core.

7 Claims, 13 Drawing Sheets

(51) Int. Cl.
*H01M 4/38* (2006.01)
*H01M 4/134* (2010.01)
*C01B 32/186* (2017.01)
*C01B 33/02* (2006.01)
*H01M 10/0525* (2010.01)
*H01M 4/1395* (2010.01)
*H01M 10/052* (2010.01)
*H01M 4/02* (2006.01)

(52) U.S. Cl.
CPC ......... *H01M 4/1395* (2013.01); *H01M 4/386* (2013.01); *H01M 4/622* (2013.01); *H01M 4/625* (2013.01); *H01M 4/628* (2013.01); *H01M 10/052* (2013.01); *H01M 10/0525* (2013.01); *C01B 2204/22* (2013.01); *C01P 2004/20* (2013.01); *C01P 2004/80* (2013.01); *C01P 2006/40* (2013.01); *H01M 2004/021* (2013.01)

(56) References Cited

U.S. PATENT DOCUMENTS

| | | | | |
|---|---|---|---|---|
| 2014/0234722 | A1* | 8/2014 | Kyotani | B82Y 30/00 |
| | | | | 429/231.8 |
| 2015/0079472 | A1* | 3/2015 | Lin | H01M 4/134 |
| | | | | 429/220 |
| 2017/0162865 | A1* | 6/2017 | Paez Duenas | H01M 4/0404 |
| 2018/0375089 | A1* | 12/2018 | Gonser | H01M 4/134 |

OTHER PUBLICATIONS

Translation of CN-103193220-A (Year: 2019).*
Yonhua Tzeng et al., "Nitrogen-incorporated ultrananocrystalline diamond and graphene nanowalls coated graphite and silicon anodes for long-life lithium ion batteries", Proceedings of the 16th International Conference on Nanotechnology, Japan, Aug. 22-25, 2016, 2 pages.
Chia-Hao Tu et al., "Heteroepitaxial Nucleation and Growth of Graphene Nanowalls on Silicon", www.sciencedirect.com—Carbon 54 (2013) pp. 234-240.

* cited by examiner

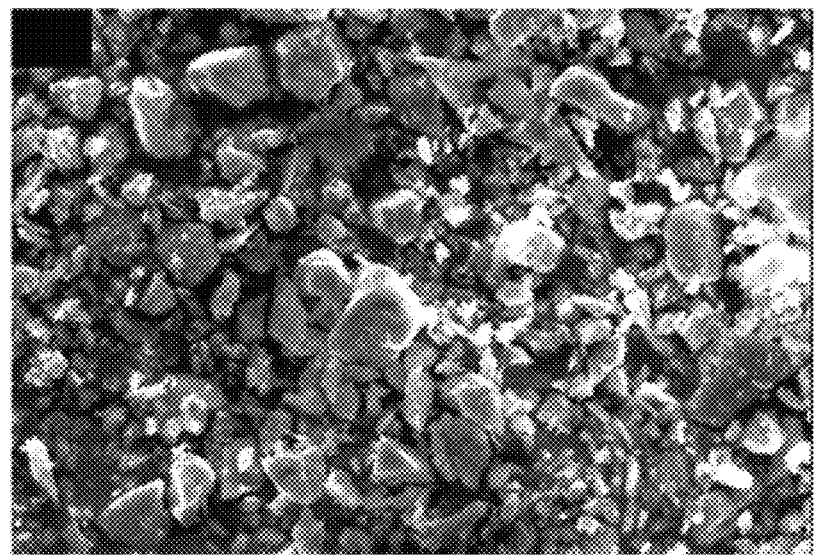
FIG. 1A
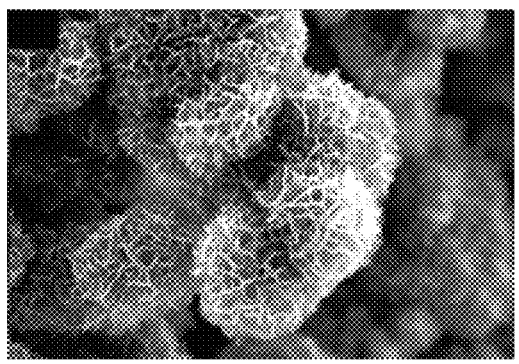 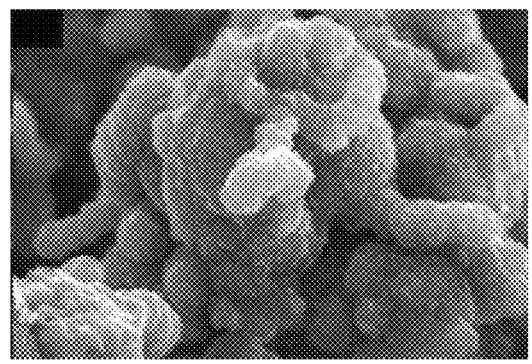
FIG. 1B  FIG. 1C

COMPOSITE ELECTRODE MATERIAL AND METHOD FOR MANUFACTURING THE SAME, COMPOSITE ELECTRODE CONTAINING SAID COMPOSITE ELECTRODE MATERIAL, AND LI-BASED BATTERY COMPRISING SAID COMPOSITE ELECTRODE

CROSS REFERENCE TO RELATED APPLICATION

This application claims the benefits of the Taiwan Patent Application Serial Number 106132042, filed on Sep. 19, 2017, the subject matter of which is incorporated herein by reference.

BACKGROUND OF THE INVENTION

1. Field of the Invention

The present invention relates to a composite electrode material and method for manufacturing the same, composite electrode containing said composite electrode material, and Li-based battery.

2. Description of Related Art

Lithium ion battery is nowadays considered as one of the most efficient ways to store energy due to its high working voltage, high energy density, high battery power, and long lifespan of storage. At present, graphite is a common commercial material for negative electrode of Li-ion battery, and the theoretical capacity value is about 372 mAhg$^{-1}$. However, a solid electrolyte interphase (SEI) formed after the first charge often results in an irreversible capacity loss. Hence, the real capacity value is lower than the theoretical value. However, the need of capacity value grows with the advance of science and technology, and simple graphite electrode is unable to meet the needs of the public nowadays.

Currently, researchers tend to study non-carbon materials regarding negative electrode materials, such as Al, Mg, Sb, Sn, Ge, Si, and so on. Among them, silicon has drawn lots of attention since it has a theoretical capacity value of up to 4200 mAhg$^{-1}$. However, the volume of silicon changes by about up to 420% during charge/discharge process, which is much higher than that of carbon (12%). Therefore, it is likely to cause pulverization of silicon, and thus the pulverized silicon particles losses conductive contact among themselves. Thereby, lithium ions cannot be successfully stored and released, and thus the capacity will decrease. At the same time, newly exposed surfaces of the pulverized silicon particles will consume the electrolyte and react with it to form new SEI. After repeated charge/discharge, the electrolyte is continuously consumed and then depleted by generating new SEI, resulting in a shortened battery lifespan.

Therefore, there is a need to develop a composite electrode material, which has a high charge storage capacity and can overcome the downsides caused by repeated charge/discharge, to obtain higher battery efficiency than that of a Li-based battery with graphite electrodes.

SUMMARY OF THE INVENTION

One object of the present invention is to provide a novel composite electrode material and method for manufacturing the same, composite electrode containing said composite electrode material, and Li-based battery comprising said composite electrode. In the present invention, the novel composite electrode material uses graphene or graphene-like carbon with a unique structure to maintain excellent battery efficiency and cycle life.

The present invention provides a composite electrode material, comprising: a core, wherein a material of the core is at least one selected from the group consisting of Sn, Sb, Si, Ge, and compounds thereof; and a graphene nanowall or a graphene-like carbon nanowall; wherein the graphene nanowall or the graphene-like carbon nanowall grows on a surface of the core.

The present invention further provides a method of manufacturing a composite electrode material, comprising steps of: providing a core, wherein a material of the core is at least one selected form the group consisting of Sn, Sb, Si, Ge, and compounds thereof; and growing a graphene nanowall or a graphene-like carbon nanowall on a surface of the core using a plasma assisted deposition.

According to the composite electrode material and the method for manufacturing the same of the present invention, the material of the core is preferred to be Si to provide a high capacity. In addition, the shape of the core is not limited. Preferably, the core is a paper-like thin sheet of silicon flake or a flake-like particle to improve the capacity and cycle count of the electrode. Furthermore, the size of the core is not limited. Preferably, a thickness of the core is in a range from 50 nm to 500 nm, more preferably from 80 nm to 120 nm, and/or a length or width of the core preferably is in a range from 50 nm to 9 μm, more preferably from 500 nm to 1200 nm.

In addition, said graphene nanowall or graphene-like carbon nanowall may grow upright on the surface of the core, so that it may have multiple and multi-directional conductivity as well as a buffer function for expansion and contraction of the silicon. Furthermore, it may protect the silicon from overreacting with the electrolyte. In addition, the core does not need to be coated with a conductive diamond film before the growth of graphene nanowall or graphene-like carbon nanowall on its surface, so said manufacturing process may save time and costs to a great extent.

According to the method for manufacturing the composite electrode of the present invention, the plasma assisted deposition may comprise a step of stirring the core with a rotary stirring machine during deposition, so that the graphene nanowalls or graphene-like carbon nanowalls may grow more evenly on the cores. Thereby, it may also reduce the time it takes to repeatedly cool and break a vacuum for stirring the core for further growth. Herein, the rate of stirring is not limited and it may be changed depending on the used stirring machine as long as the graphene nanowalls or graphene-like carbon nanowalls can grow more evenly on cores. In addition, conditions of said plasma assisted deposition are not limited and it may be adjusted in accordance with the desired shape and size of the graphene nanowalls or graphene-like carbon nanowalls.

Said plasma assisted deposition of the present invention may be any plasma assisted deposition known in the art, for example, but not limited to, microwave plasma chemical vapor deposition (microwave plasma CVD), to grow the graphene nanowalls or graphene-like carbon nanowalls on the surfaces of the cores.

In one aspect of the present invention, the microwave plasma chemical vapor deposition is preferably conducted at 700-125° C. to grow the graphene nanowall or graphene-like carbon nanowall on the surface of a core.

In one aspect of the present invention, said microwave assisted microwave plasma chemical vapor deposition may comprise two stages. In the first stage, said microwave plasma CVD may be carried out for 10-30 minutes at a condition of 700-1000 W of microwave power, 1-5 sccm of $H_2$, 70-80 sccm of Ar, 20-30 sccm of $N_2$, 70-120 torr, and 700-900° C. silicon temperature to remove the native oxide layer on the surface of the silicon and to heat the silicon before the growth of graphene nanowall or graphene-like carbon nanowall. In the second stage, said microwave plasma CVD was carried out for 10-60 minutes at a condition of 950-1050 W of microwave power, 70-120 torr, 1050-1250° C. with the flow of 3-8 sccm of $CH_4$, 65-75 sccm of Ar, and 20-30 sccm of $N_2$ to grow the graphene nanowalls or graphene-like carbon nanowalls. However, the conditions for the microwave plasma CVD used herein are merely exemplary, and the present invention is not limited thereto. Furthermore, any person skilled in the art can change aforementioned conditions if necessary.

The present invention further provides a composite electrode, comprising: a substrate on which an active material layer is disposed, wherein the active material layer comprises: a composite electrode material according to aforementioned composite electrode material and an adhesive.

In the composite of the present invention, the substrate may be a conductive metal plate. Moreover, a material of the conductive metal plate may, by way of example and not limitation, be a copper foil which is commonly used in the art. Furthermore, the thickness of the copper foil may be changed if necessary.

In the composite electrode of the present invention, the adhesive may, by way of example and not limitation, be sodium carboxymethyl cellulose (NaCMC), poly acrylic acid (PAA), and the like. In one aspect of the present invention, NaCMC is used as an adhesive.

In the composite electrode of the present invention, the electrode material is prepared by the aforementioned method. Therefore, the detail of the method will not be described here.

The present invention further provides a lithium based battery, comprising: a composite electrode described above; a counter electrode made of lithium metal or a lithium containing compound; a separator disposed between the composite electrode and the counter electrode; and an electrolyte disposed between the composite electrode and the counter electrode and also disposed on both sides of the separator. The counter electrode may, by way of example and not limitation, be a lithium electrode. Any person skilled in the art can change the counter electrode, i.e. positive electrode, from a lithium counter electrode to a counter electrode made of a lithium containing compound.

As described above, the composite electrode material of the present invention has a special structure, which is graphene nanowalls or graphene-like nanowalls directly grown on the core, to absorb the stress resulting from the silicon volume change due to charging/discharging. In addition, the graphene nanowalls or graphene-like carbon nanowalls have excellent electrical conductivity, and thus can transport electrons effectively as well as prevent the core from overreacting with the electrolyte. These properties improve the battery cycle life. Therefore, the Li-based battery of the present invention has long battery cycle life and high charge storage capacity, and thus has excellent charging/discharging characteristics and Coulombic efficiency after numerous cycles.

Other objects, advantages, and novel features of the invention will become more apparent from the following detailed description when taken in conjunction with the accompanying drawings.

BRIEF DESCRIPTION OF THE DRAWINGS

FIG. 1A shows an SEM image of the silicon powder according to one embodiment of the present invention.

FIG. 1B and FIG. 1C show SEM images of the composite electrode material according to one embodiment of the present invention.

DETAILED DESCRIPTION OF THE PREFERRED EMBODIMENT

[Preparation Example 1] Preparation of Composite Electrode Material

Silicon particles of diameter from 1 to 5 μm, flake-like silicon particles having a thickness of 200 nm, or flake-like silicon particles having a thickness of 100 nm were provided in a system of microwave plasma chemical vapor deposition (ASTex 501 system from Seki Corporation), and evacuated to a high vacuum. In the first stage, microwave plasma CVD was applied for 10 minutes at a condition of 1000 W of microwave power at 2.45 GHz of microwave frequency with 3 sccm of $H_2$, 25 sccm of $N_2$, and 72 sccm of Ar flow, 90 torr gas pressure, and about 850° C. silicon temperature to remove the native oxide layer on the surface of the silicon particles. In the second stage, microwave plasma CVD was carried out for 30 minutes at a condition of 1000 W of microwave power, 2.45 GHz of microwave frequency, 5 sccm of $CH_4$, 25 sccm of $N_2$, 70 sccm of Ar gas flow, 90 torr gas pressure, and up to about 1200° C. silicon temperature to grow graphene nanowalls or graphene-like carbon nanowalls on the surface of the silicon. At the end of the microwave plasma CVD, the system was shut down and the silicon particles were moved out after cooling. Furthermore, in the process of microwave plasma CVD, a rotary stirring machine was used to stir the silicon particles, so that the graphene nanowalls or the graphene-like carbon nanowalls can grow more evenly on the silicon particles. In addition, in the present invention, the silicon particles had excellent charge/discharge characteristics without the need for coating a conductive diamond film on the surface of the silicon in advance. Therefore, the preparation method could save significant time and costs to a great extent.

FIG. 1A showed a SEM image of the silicon powder of the present embodiment, wherein the silicon particles of diameter from 1 to 5 μm and having an irregular shape were used here for the convenience of observation. FIG. 1B and FIG. 1C showed SEM images of the composite electrode material of the present embodiment, and FIG. 1B showed graphene nanowalls or graphehe-like carbon nanowalls grown for 5 minutes. As shown in FIG. 1B, the silicon particles deposited by microwave plasma CVD had multi-layer of graphene or graphehe-like carbon standing on the silicon particles like walls, and thus they were called graphene nanowalls or graphene-like carbon nanowalls. FIG. 1C shows a structure of sponge-like carbon coating on the silicon particles, and it was progressively formed with time by accumulation of the graphene nanowalls or graphene-like carbon nanowalls.

Figure 1D:
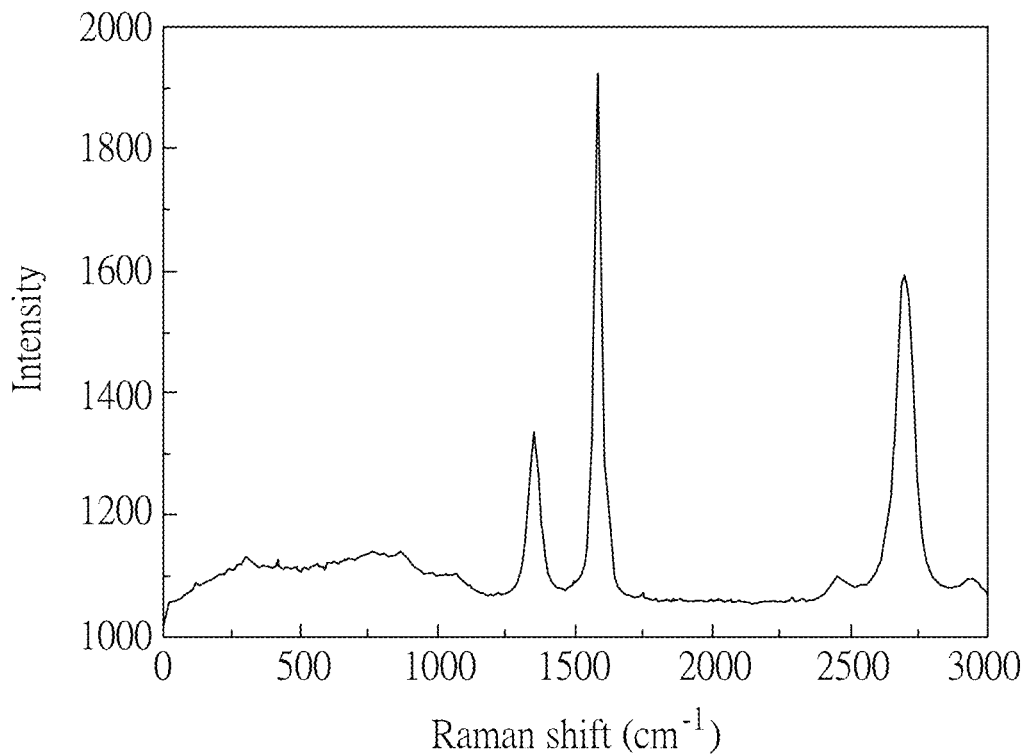
FIG. 1D shows a Raman spectrum of the composite electrode material according to one embodiment of the present invention.
Figure 1E:
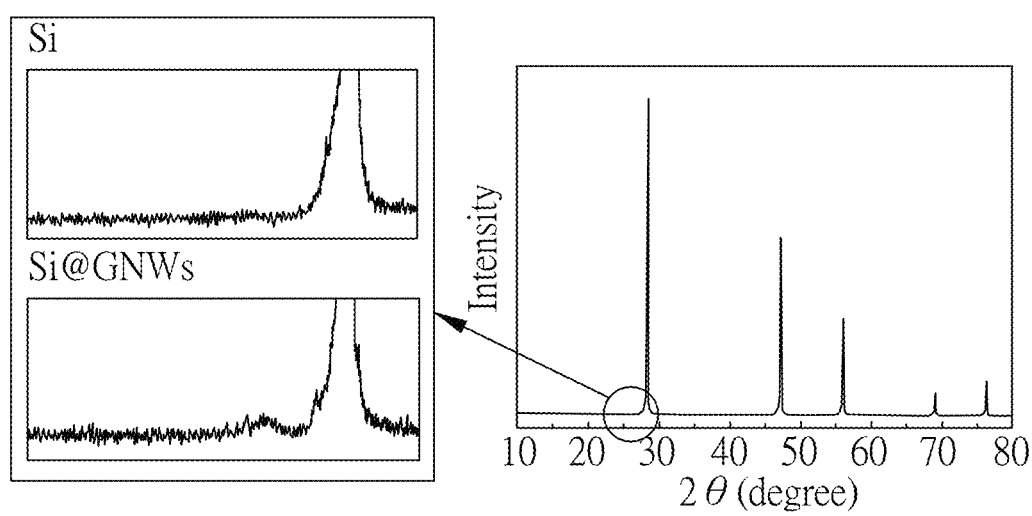
FIG. 1E shows a comparison diagram of x-ray diffraction (XRD) for the composite electrode material according to one embodiment of the present invention.

FIG. 1D showed a Raman spectrum of the composite electrode material according to the present invention, wherein green laser (λ=532 nm) was applied in analysis. As shown in FIG. 1D, a D band of 1349 $cm^{-1}$, a G band of 1578 $cm^{-1}$, and a 2D band of 2689 $cm^{-1}$, which were characteristic peaks of graphene or graphene-like carbon, were found. Furthermore, FIG. 1E showed a comparison diagram x-ray diffraction (XRD) for the composite electrode of the present invention. The characteristic peaks of 28°, 47°, 56°, 69°, and 76° presented the crystalline phase of the silicon, and a weak peak was found at 26° in the enlarged diagram, indicating the presence of hexagonal flake of graphene crystal. Therefore, the presence of crystalline phase of silicon was determined. According to the results from the abovementioned experiments, it had been demonstrated that the electrode material could form a graphene nanowall or graphene-like carbon nanowall coating on the surface of the silicon powder.

[Preparation Example 2] Preparation of a Composite Electrode

The composite electrode material prepared as described above, conductive carbon black, and adhesive NaCMC were mixed at a weight ratio of 6:3:1. And then the mixture was added with deionized water, and stirred with a DC stirring machine until the mixture was even to obtain an active material. The active material was provided in a vacuum chamber, evacuated to a low pressure to remove trapped vapor and gases from the active material, and followed by using a scraper to coat on a copper foil (10 μm) with the active material (30 μm of thickness) to obtain an electrode. After that, the coated electrode was provided in a vacuum oven, evacuated to a vacuum, and baked at 65° C. for 12 hours to remove excess solvent. After cooling, a roller press machine was applied to roll the baked electrode to increase the packaging density of the electrode. Finally, a cutter knife was applied to obtain an electrode with desired sizes.

[Preparation Example 3] Preparation of Lithium Half-Cell

Figure 2:
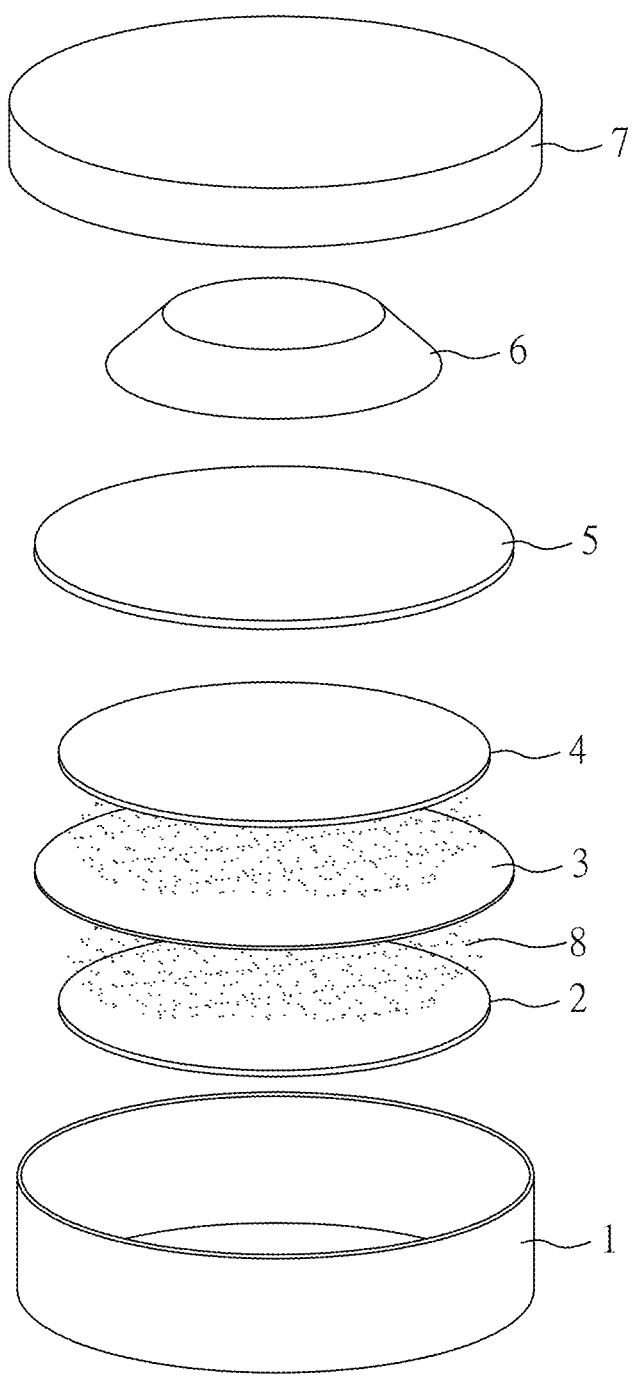
FIG. 2 shows a schematic of the Li-based battery according to one embodiment of the present invention.

FIG. 2 showed a schematic of the Li-based battery of the present embodiment. Here, a composite electrode 4 prepared as described above, which was used as a negative electrode, a metal bottom cover 1, a lithium counter electrode 2, a separator 3 (Celgard 2355), a metal gasket 5, a metal spring 6, and a metal top cover 7 were provided in a glove box. Further, 1M $LiPF_6$ solution dissolved in EC/DEC (1:1 v/v) was used as an electrolyte 8. The abovementioned materials were assembled into a button cell in accordance with FIG. 2, and then sealed with a battery packaging machine to form a lithium half-cell of the present embodiment. However, this embodiment is merely illustrative, and the lithium half-cell of the present invention is not limited thereto.

As shown in FIG. 2, the lithium battery of the present embodiment comprised: a composite electrode 4 prepared as described above; a lithium counter electrode 2; a separator 3 disposed between the composite electrode 4 and the lithium counter electrode 2; and an electrolyte 8 disposed between the composite electrode 4 and the lithium counter electrode 2 and also disposed on both sides of the separator 3.

[Test Example 1] Comparison of Cycle Performance

Figure 3A:
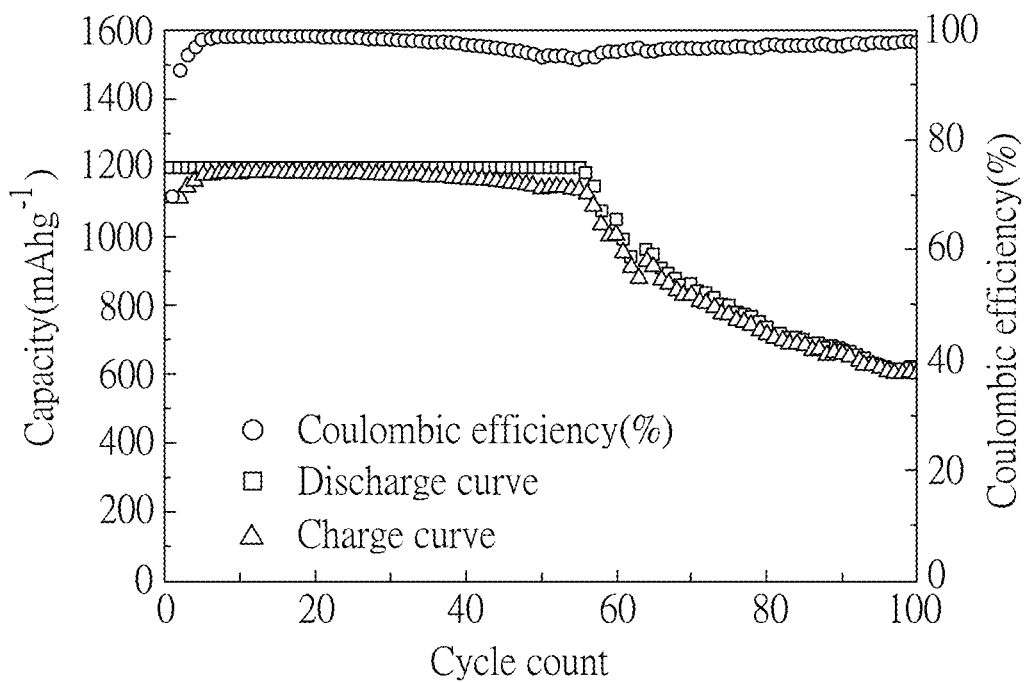
FIG. 3A and FIG. 3B respectively show the correlation between capacity and cycle count of the composite electrode with and without the rotary stirring machine.
Figure 3B:
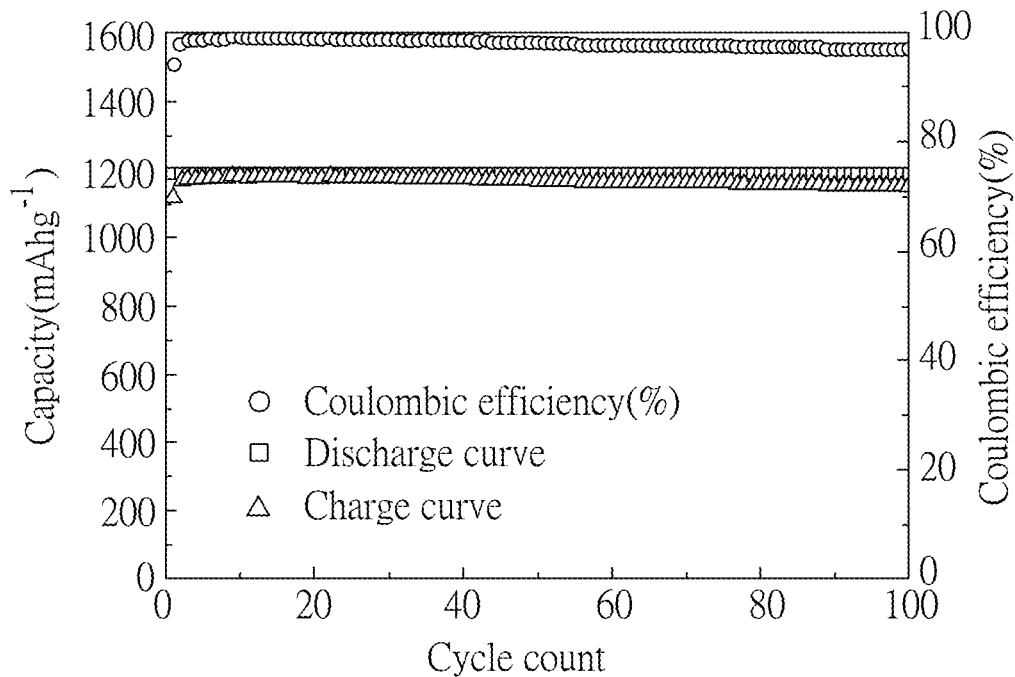

FIG. 3A and FIG. 3B showed the correlation between charge/discharge capacity and cycle count at a constant capacity of 1200 $mAhg^{-1}$ for the different composite electrodes using different composite electrode materials, which were prepared by different preparation processes. FIG. 3A was related to a composite electrode prepared by using a composite electrode material without applying a rotary stirring machine; FIG. 3B was related to a composite electrode prepared by using a composite electrode material which was stirred by a rotary stirring machine. In the present embodiment, a thickness of the flake-like silicon particles was 200 nm. Furthermore, the composite electrode material using the rotary stirring machine was prepared by the aforementioned preparation method and thus the method was omitted. On the contrary, the preparation method for the composite electrode material without using the rotary stirring machine was substantially the same as aforementioned preparation method, except that the silicon particles were stirred after microwave plasma CVD was finished followed by additional microwave plasma CVD rather than being stirred in-situ during the microwave plasma CVD. In addition, the composite electrode was prepared by the aforementioned preparation method and thus the method was omitted.

The present embodiment used a constant current charge/discharge method. In the first three cycles, charge/discharge rate was 0.02 C, and then changed to 0.1 C for the remaining test. Further, in order to observe the performance difference between two preparation methods, charging at a constant capacity of 1200 $mAhg^{-1}$ was applied at the same time. As shown in the FIG. 3A, the battery prepared without using a rotary stirring machine during the microwave plasma CVD could only charge/discharge for 50 cycles at a capacity of 1200 mAhg$^{-1}$. However, the battery prepared with using a rotary stirring machine during the microwave plasma CVD could charge/discharge for 100 cycles at a capacity of 1200 mAhg$^{-1}$ as shown in FIG. 3B. Therefore, using a rotary stirring machine enabled the graphene nanowalls or graphene-like carbon nanowalls to more evenly coat the silicon particles. Furthermore, with such a stirring mechanism, there was no need to break a vacuum of the chamber to stir the material after manufacturing process every time. It can not only save time, but also improve the process efficiency.

[Test Example 2] Cycle Performances of Various Particle Sizes

Figure 4A:
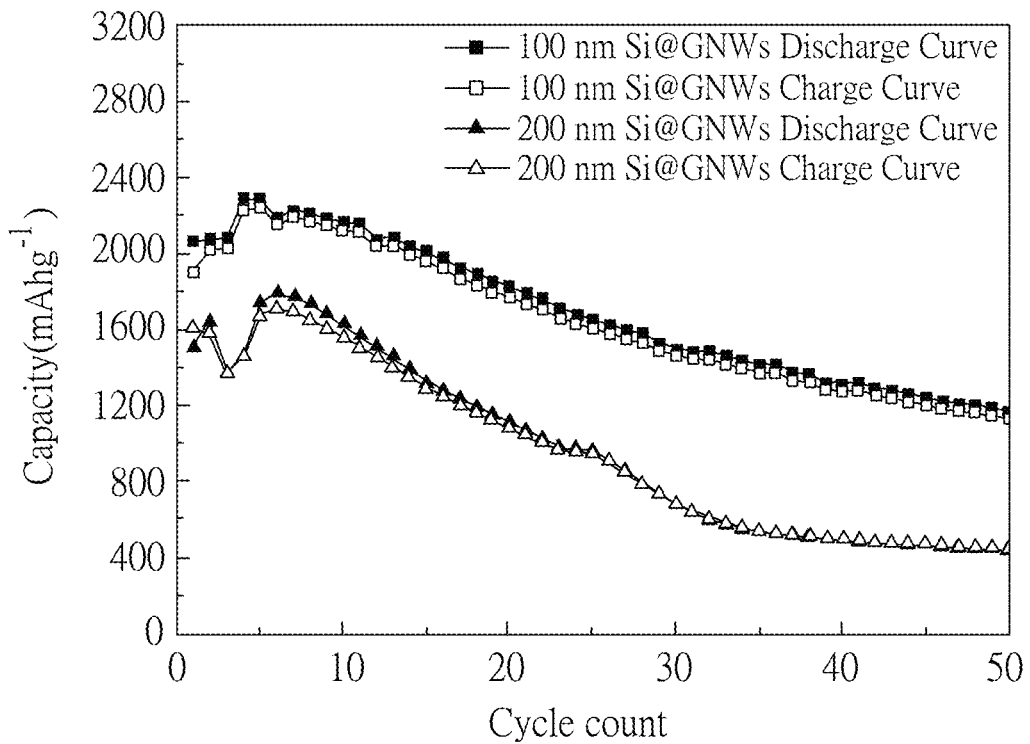
FIG. 4A shows the correlation between capacity and cycle count for the composite electrodes using the composite electrode materials of flake-like silicon particles having a thickness of 200 nm or 100 nm.

FIG. 4A showed the correlation between capacity and cycle count for the composite electrodes using the composite electrode materials of flake-like silicon particles having a thickness of 200 nm and 100 nm at no designated capacity. Furthermore, the composite electrode material and the composite electrode were prepared as described above and thus omitted from description here. As shown in the FIG. 3A, the composite electrode prepared by using silicon particles having a thickness of 100 nm had a capacity of up to 2400 mAhg$^{-1}$ in the initial cycles, whereas the composite electrode prepared by using silicon particles having a thickness of 200 nm merely had a capacity of up to 1800 mAhg$^{-1}$. Moreover, the capacity of the composite electrode prepared by using silicon particles having a thickness of 100 nm was still 1200 mAhg$^{-1}$ after 50 cycles of charge/discharge, while the capacity of the composite electrode prepared by using silicon particles having a thickness of 200 nm merely was 400 mAhg$^{-1}$. This was because the volume expansion rate of silicon negative electrode material could reach 420% under a circumstance of full charge/discharge, easily causing rupture of silicon particles. However, the problem brought by the volume expansion might be reduced when the thickness of the silicon particles was less than 150 nm.

Figure 4B:
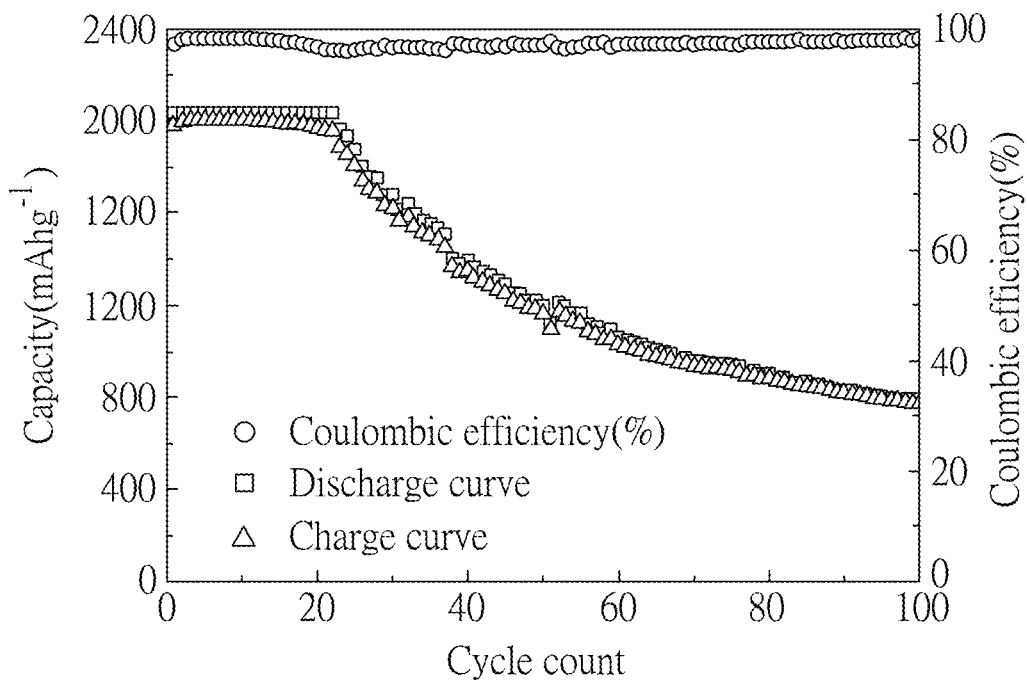
FIG. 4B and FIG. 4C respectively show the correlation between capacity and cycle count for the composite electrodes using the composite electrode materials of flake-like silicon particles having a thickness of 200 nm and 100 nm under a constant capacity.
Figure 4C:
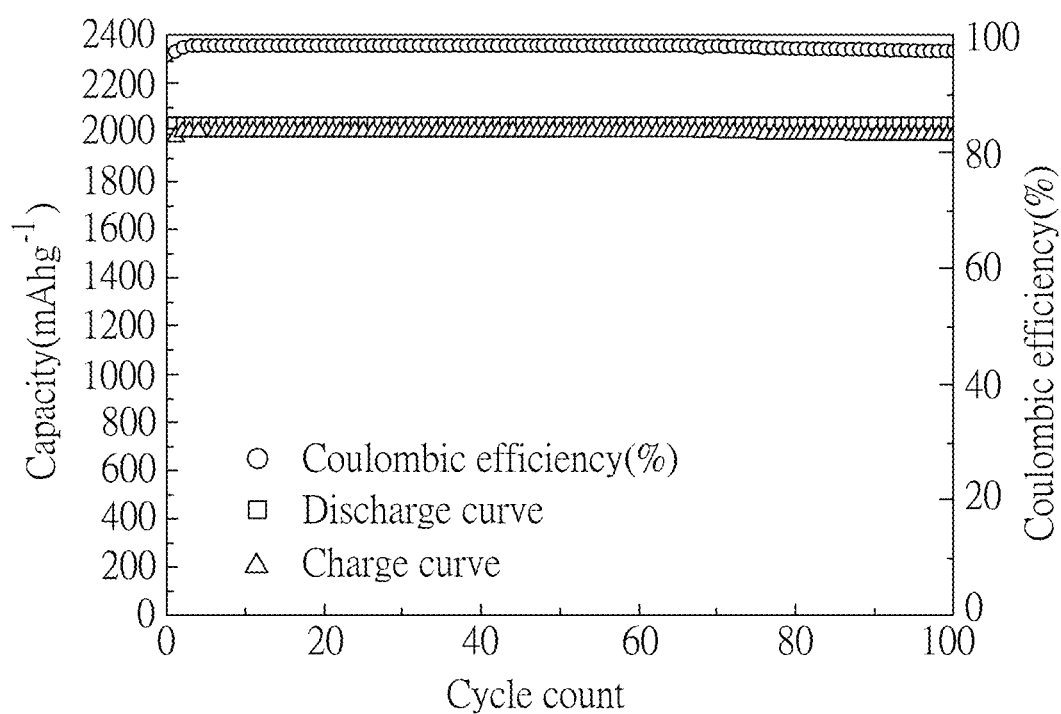

FIG. 4B and FIG. 4C respectively showed the correlation between capacity and cycle count for the composite electrodes using the composite electrode materials of flake-like silicon particles having a thickness of 200 nm and 100 nm at a constant capacity of 2000 mAhg$^{-1}$. Furthermore, the composite electrode material and the composite electrode were prepared as described above and thus omitted from description here. The charge/discharge rate of the first three cycles was 0.02 C, and changed to 0.1 C for the remaining cycles. As shown in FIG. 4B, the composite electrode using the composite electrode materials of flake-like silicon particles having a thickness of 200 nm could only maintain about 20 cycles of charge/discharge at a capacity of 2000 mAhg$^{-1}$. On the contrary; the composite electrode using the composite electrode materials of flake-like silicon particles having a thickness of 100 nm could maintain 100 cycles of charge/discharge.

The following analysis and comparison were made based on a silicon electrode prepared by using flake-like silicon particles having a thickness of 100 nm and without coatings as well as a Li-based battery prepared by the composite electrode material using flake-like silicon particles having a thickness of 100 nm and with graphene nanowall or graphene-like carbon nanowall.

[Comparison Example 1] Analysis of Charge/Discharge Cycle

Figure 5A:
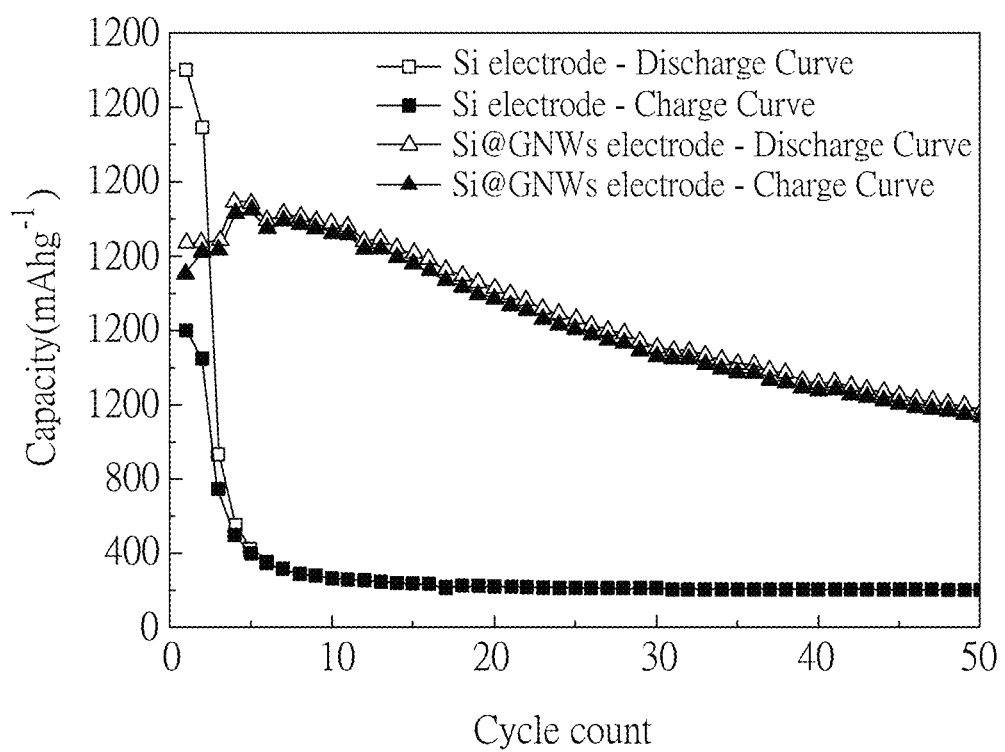
FIG. 5A shows the correlation between capacity and cycle count for the silicon electrode and the composite electrode.

FIG. 5A showed the correlation between capacity and cycle count for the silicon electrode and the composite electrode. As shown in FIG. 5A, the capacity of the composite electrode was more than 1000 mAhg$^{-1}$ after 50 of charge/discharge cycles. However, although the capacity of the silicon electrode was up to about 3000 mAhg$^{-1}$ in the beginning, it soon fell below 1000 mAhg$^{-1}$. Referring to the first three charge/discharge cycles, the irreversible decrease in capacity of the silicon electrode represented that the silicon was ruptured during expansion and contraction so that the silicon lost conductive contact with each other. In addition, the stress resulted from the volume change led to the disconnection of the negative electrode and current collector, and thus electrons could not be transported effectively. At the same time, newly formed surfaces of the pulverized silicon particles would further react with the electrolyte to form solid electrolyte interphase, increasing the internal resistance.

Figure 5B:
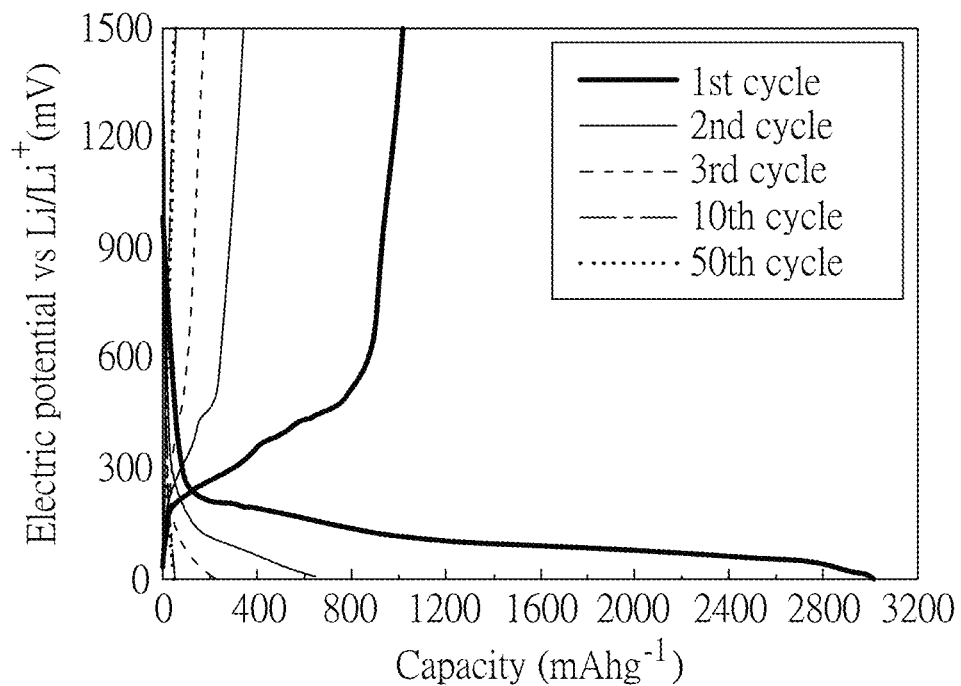
FIG. 5B and FIG. 5C respectively show the correlation between electric potential and capacity for the silicon electrode and the composite electrode.
Figure 5C:
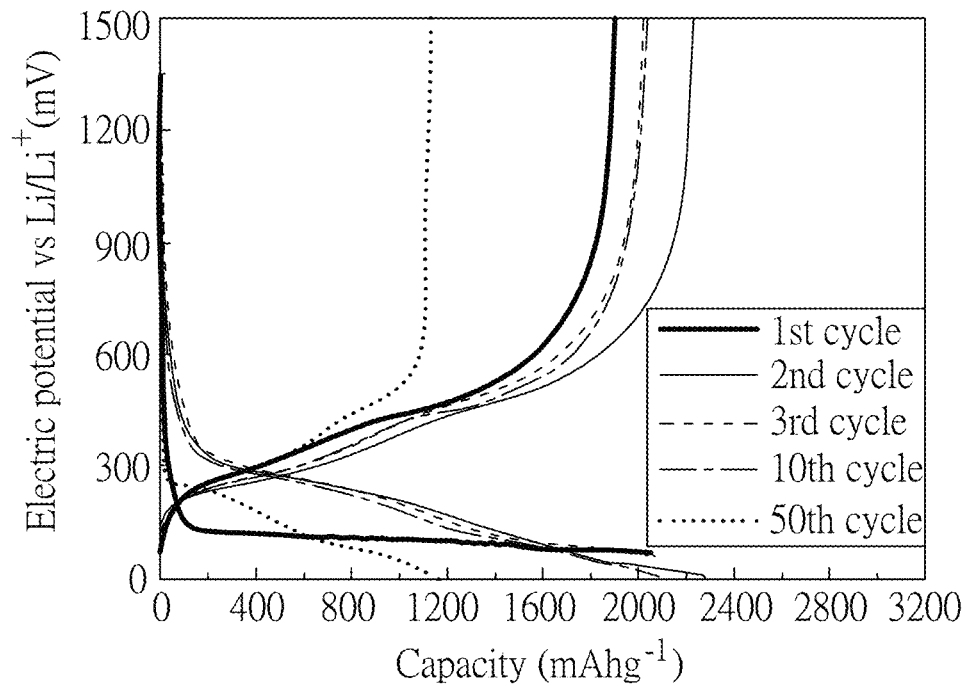

FIG. 5B and FIG. 5C respectively showed the correlation between electric potential and capacity for the silicon electrode and the composite electrode. As shown in the FIG. 5B, in the first cycle, the silicon electrode had a flat curve on the middle of the plot. However, the slope gradient of the flat curve on the middle of the plot rapidly increased with the charge/discharge counts. In addition, the capacity of the silicon electrode decreased rapidly, indicating that the battery was unable to form a stable lithium-silicon alloy phase. As a result, it caused a rapid loss of capacity. On the contrary, the composite electrode had flat curves for all cycle counts, and remained flat curve after repeated charge/discharge, as shown in the FIG. 5C. Therefore, it demonstrated that the coating of the graphene nanowalls or graphene-like carbon nanowalls could effectively improve the performance of the Li-ion battery.

Figure 6A:
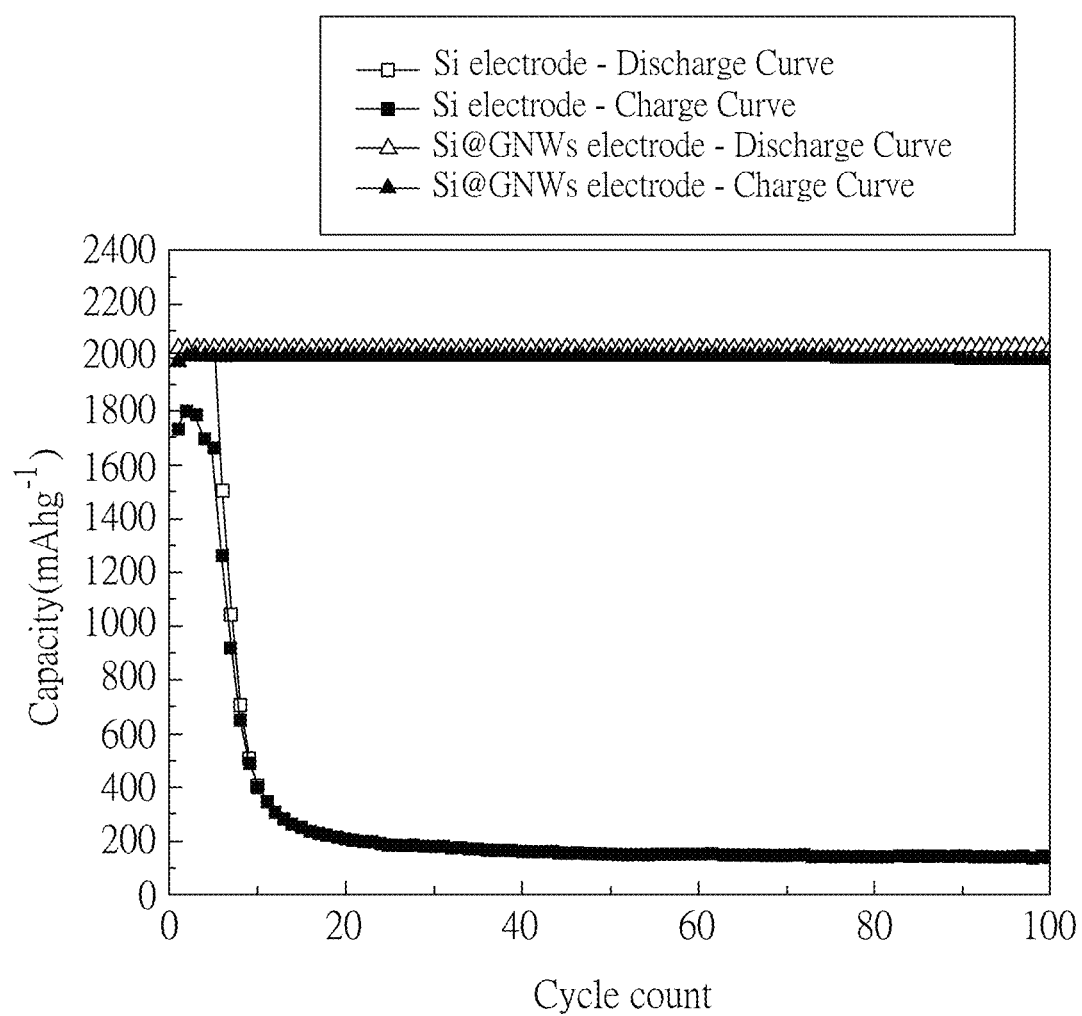
FIG. 6A shows the correlation between capacity and cycle count for the silicon electrode and the composite electrode at a constant capacity.

[Comparison Example 2] Analysis of Charge/Discharge Cycle at a Constant Capacity It was known that charge/discharge at a constant capacity could limit the amount of lithium ions insertion into the silicon and reduce the volume expansion. Therefore, when the battery capacity was set at a smaller value, the cycle life could be longer. The cycle life of the silicon electrode and composite electrode at a constant capacity were compared hereinafter. FIG. 6A showed cycle performance of the silicon electrode and the composite electrode at a constant capacity of 2000 mAhg$^{-1}$. As shown in the FIG. 6A, the composite electrode could maintain 100 cycles at a constant capacity of 2000 mAhg$^{-1}$, while the silicon electrode could not maintain stable even at a constant capacity of 2000 mAhg$^{-1}$.

Figure 6B:
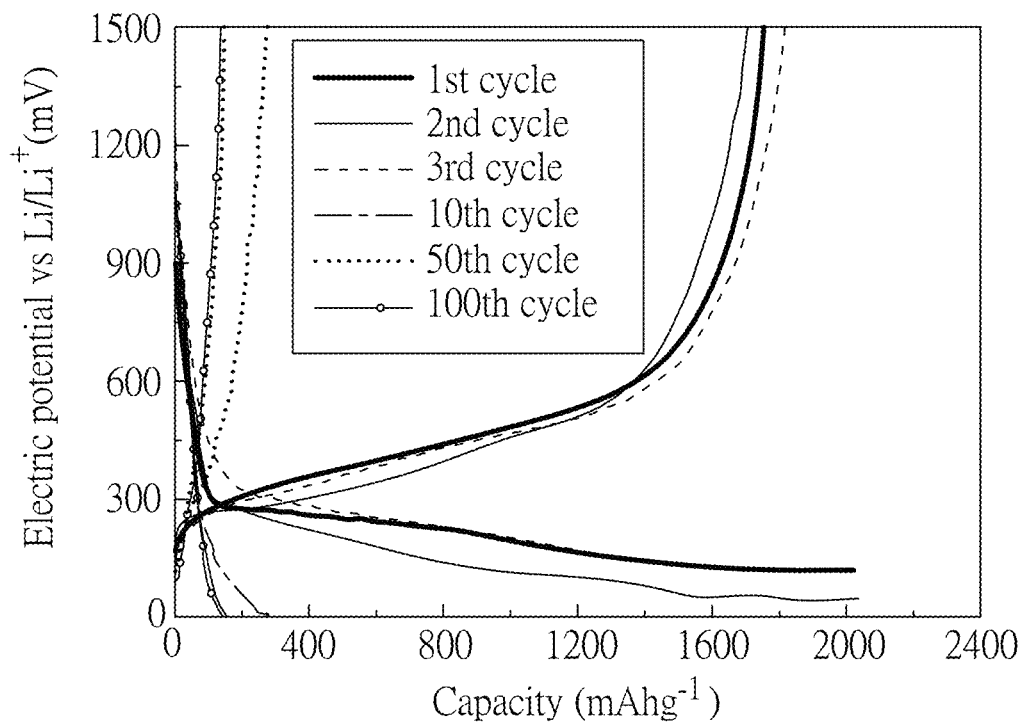
FIG. 6B and FIG. 6C respectively show the correlation between electric potential and capacity for the silicon electrode and composite electrode.
Figure 6C:
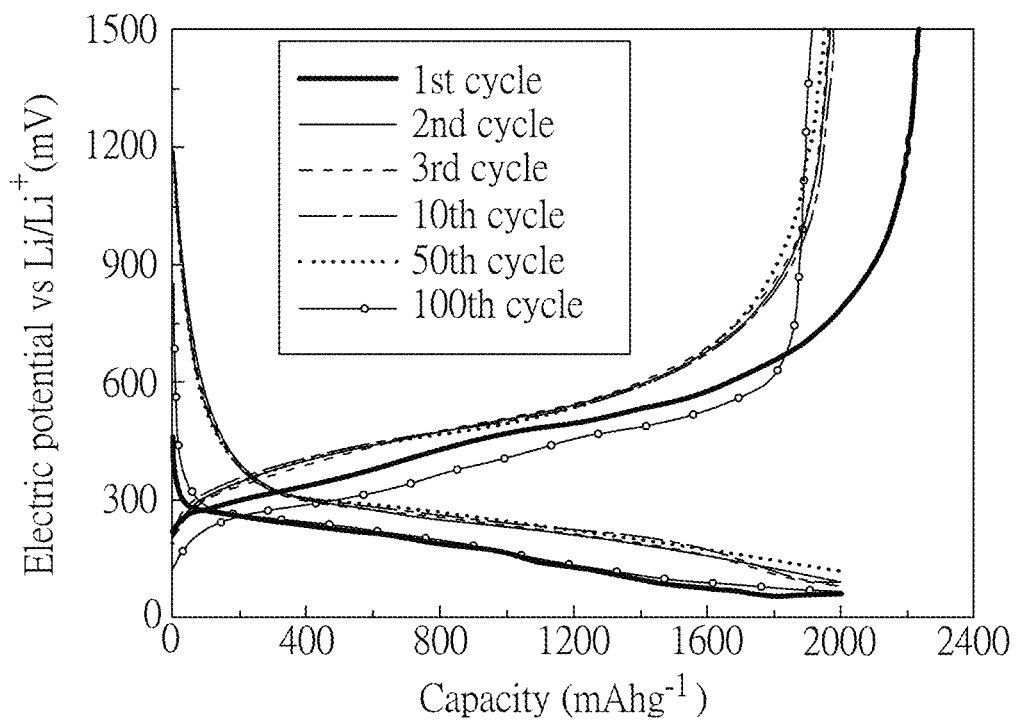

FIG. 6B and FIG. 6C respectively showed the correlation between electric potential and capacity at a constant capacity of 2000 mAhg$^{-1}$ for the silicon electrode and composite electrode. As shown in FIG. 6B, the silicon electrode had flat curves on the middle of the plot in the first three cycles. However, the slope gradient of the flat curve on the middle of the plot rapidly increased with the charge/discharge counts. In addition, the capacity of the silicon electrode decreased rapidly. On the contrary; the composite electrode had smaller slope gradients on the middle of the plot for all cycle counts and remained as flat curves after 100 cycles of charge/discharge. Furthermore, the composite electrode still had a capacity of about 1800 mAhg$^{-1}$ after repeated charge/discharge. Therefore, it demonstrated that the coating of the graphene nanowalls or graphene-like carbon nanowalls could effectively improve the cycle life of the Li-ion battery.

[Comparison Example 3] Cyclic Voltammetry Analysis

Figure 7A:
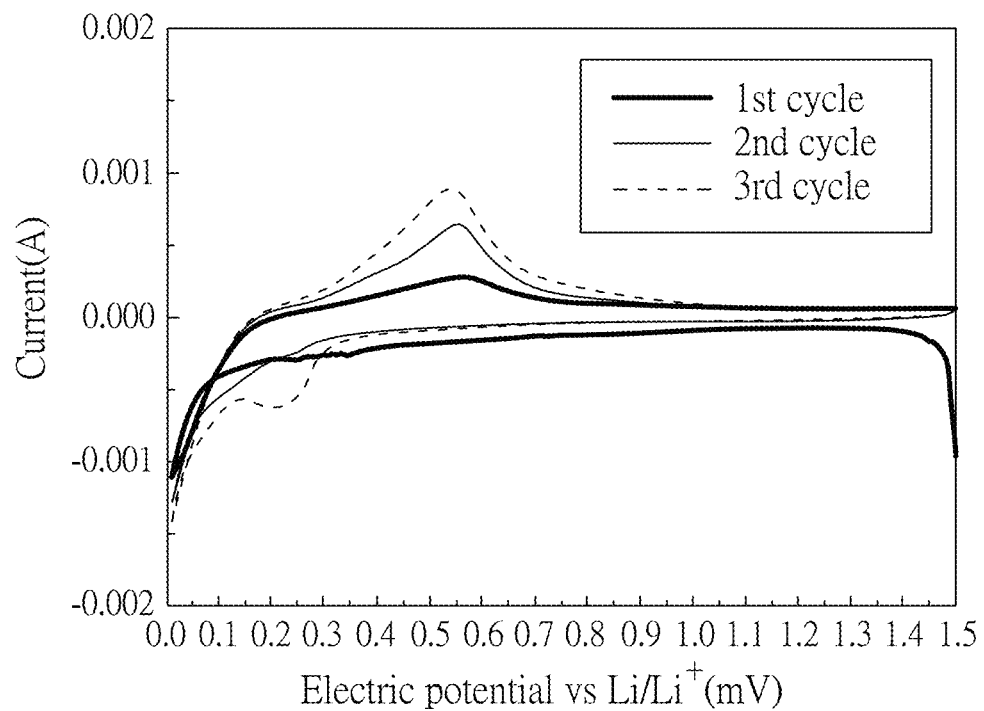
FIG. 7A and FIG. 7B respectively show the cyclic voltammetry plot for the silicon electrode and composite electrode.
Figure 7B:
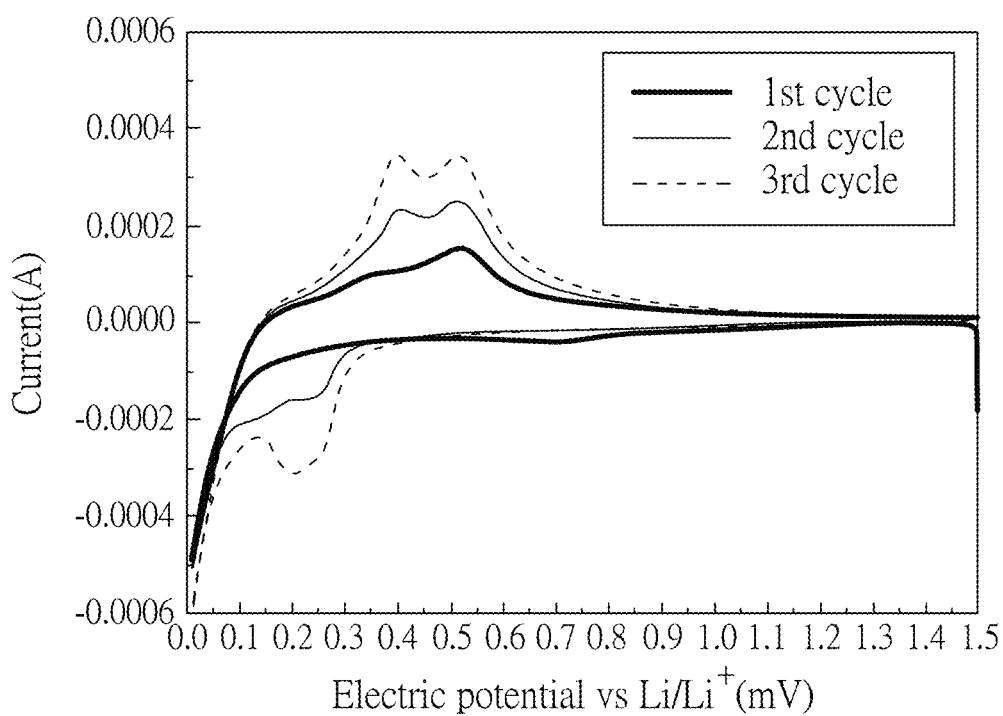

Cyclic voltammetry analysis was used to evaluate lithium insertion to, and release from the negative electrode, and other electrochemical characteristics of the battery. FIG. 7A and FIG. 7B showed the cyclic voltammetry of the silicon electrode and composite electrode, respectively. In the present embodiment, the scan rate was 0.1 mV/s, and the scanned potential ranged from 0 V to 1.5 V.

As shown in FIG. 7A, a weak reduction peak at near 0.65 V in the reduction curve for the first cycle represented a formation of solid electrolyte interphase; the reductive peak at 0.2 V represented a phase transition transforming amorphous silicon to $Li_xSi$ in the reaction. In the oxidation curve, there was an oxidation peak at near 0.5V, and it became more obvious with cycle count, indicating the presence of some activations.

Compared with the silicon electrode, the composite electrode was found to have an oxidation peak at near 0.4 V, as shown FIG. 7B. Accordingly, it indicated that properties of the silicon surface were changed, proving that the silicon particles of the composite electrode were coated with graphene nanowalls or graphene like-carbon nanowalls. In addition, as shown in FIGS. 7A and 7B, the redox current of the silicon electrode was greater than that of the composite electrode, which means that coating of the graphene nanowalls or graphene-like carbon nanowalls was able to protect the silicon particles from excessive reaction with the electrolyte. As a result, the battery performance was improved.

[Comparison Example 4] Electrochemical Impedance Spectroscopy

Figure 8:
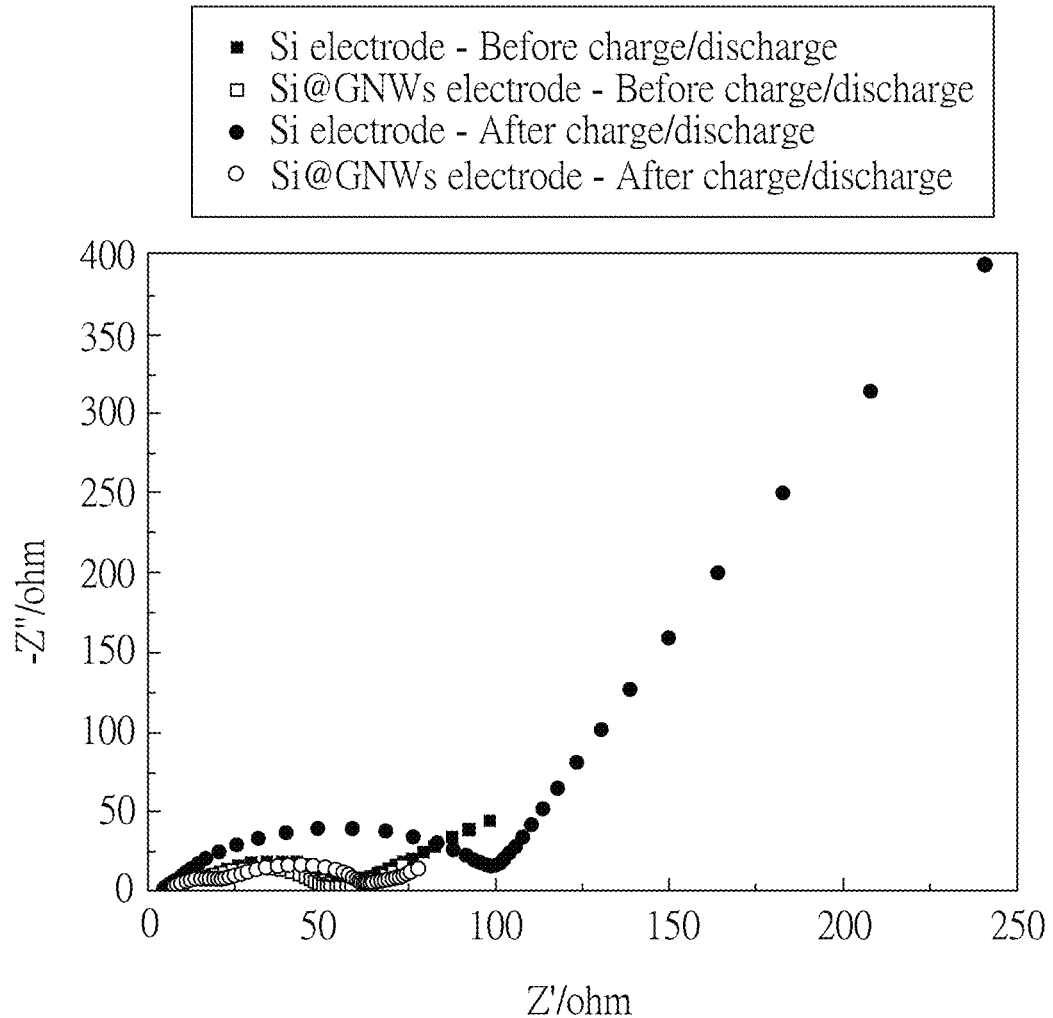
FIG. 8 shows a Nyquist plot of the silicon electrode and composite electrode before and after charge/discharge cycling.

FIG. 8 showed a Nyquist plot of electrochemical impedance spectroscopy. In the FIG. 8, the semicircle indicated measured value at high frequency representing the resistance transferred by the electrolyte. Furthermore, the larger the diameter of the semicircle was, the higher the transfer resistance was. In addition, the oblique line represented was measured values at low frequency, and it represented the spreading resistance of lithium ion in the electrode materials. Moreover, the larger the slope gradient of the oblique line was, the greater the spreading resistance of the Li-ion battery was.

As shown in FIG. 8, it showed experimental results of the silicon electrode and composite electrode before/after 100 cycles of charge/discharge. After charge/discharge, the diameter of the semicircle for the silicon electrode became much greater than it was before charge/discharge. It represented that the silicon electrode material was pulverized because of repeated expansion and contraction. Furthermore, the newly formed surfaces of the pulverized silicon particles reacted with the electrolyte to form a solid electrolyte interphase. As a result, the internal resistance was raised, and the diameter of the semicircle became larger. In addition, the slope gradient of the oblique line was significantly larger than it was before charge/discharge, representing the loss of conductive contact inside the battery. Therefore, the electrons and Li-ions could not be properly transported, causing the difficulty in spreading the Li-ions.

On the contrary, there was a slight difference in the diameter of the semicircle for the composite electrode after charge/discharge, and the slope gradient almost remained the same as well. Accordingly, it represented that the graphene nanowalls or graphene-like carbon nanowalls were used as buffer layers for volume expansion during charge/discharge. Furthermore, since the graphene nanowalls or graphene-like carbon nanowalls had excellent conductivity, it could provide electrons with excellent conduction paths. In addition, the graphene nanowalls or graphene-like carbon nanowalls were used as protection layers in order to prevent the silicon from overacting with the electrolyte and form a solid electrolyte interface. As a result, coating of the graphene nanowalls or graphene-like nanowalls could effectively improve the performance of Li-ion battery.

[Comparison Example 5] Analysis for Electrochemical Measurement

Figure 9B:
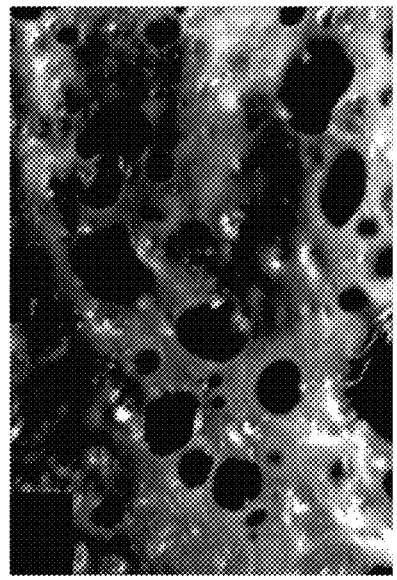
FIG. 9A and FIG. 9B respectively show a SEM image of the silicon electrode before and after charge/discharge.
Figure 9D:
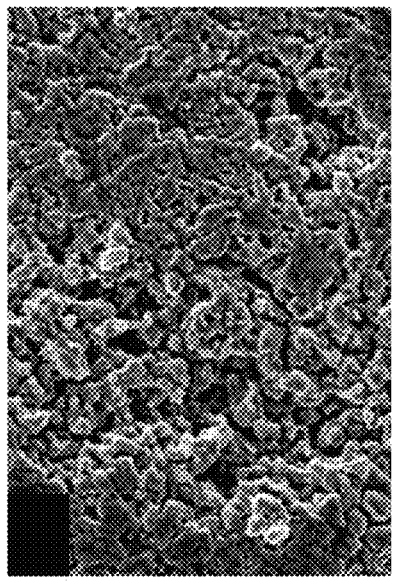
FIG. 9C and FIG. 9D respectively show a SEM image of the composite electrode before and after charge/discharge.
Figure 9A:
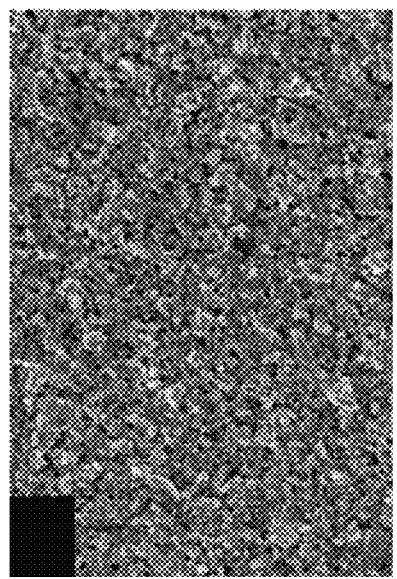
Figure 9C:
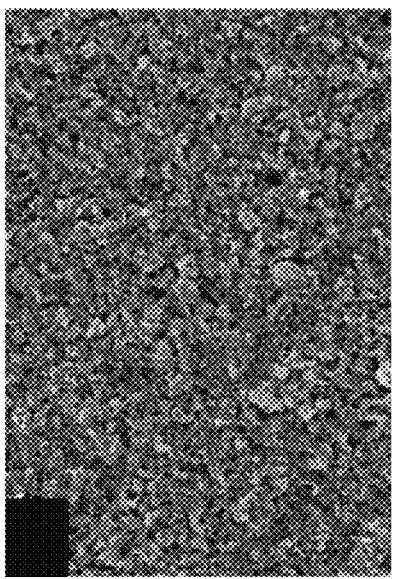

FIG. 9A and FIG. 9B respectively showed a SEM image of the silicon electrode before and after charge/discharge. FIG. 9C and FIG. 9D respectively showed an SEM image of the composite electrode before and after charge/discharge. As shown in FIGS. 9A and 9C, electrode sheets of the silicon electrode and composite electrode are both intact before charge/discharge. However, there were many holes formed on the electrode sheet of the silicon electrode after repeated charge/discharge, as shown in FIG. 9B. These holes were caused by volume expansion of the silicon after charge/discharge, and most of the silicon particles are pulverized. On the contrary, as shown in FIG. 9D, the electrode sheet of the composite electrode still had intact particles after repeated charge/discharge, representing a stable solid electrolyte interphase was formed on the surface. Furthermore, the graphene nanowalls or graphene-like carbon nanowalls were able to protect the silicon from overreacting with the electrolyte, and acted as buffer layers for absorbing stress of the silicon caused by the volume change, so the silicon would not easily break apart. Therefore, the composite electrode could effectively improve the performance of the battery.

Although the present invention has been explained in relation to its preferred embodiment, it is to be understood that many other possible modifications and variations can be made without departing from the spirit and scope of the invention as hereinafter claimed.

What is claimed is:

1. A composite electrode material, comprising:
   a core, wherein the core is a silicon flake, and a thickness of the core is in a range from 50 nm to less than 150 nm; and
   a graphene nanowall;
   wherein the graphene nanowall directly grows upright on a surface of the core;
   wherein the graphene nanowalls each comprises a solid interior,
   wherein tips of the graphene nanowalls are free standing,
   wherein the graphene nanowall is characterized by a Raman spectrum exhibiting a signal strength of a 2D-band higher than a signal strength of a D-band, and a signal strength of a G-band higher than the signal strength of the 2D-band.

2. The composite electrode material as claimed in claim 1, wherein a length of the core is in a range from 50 nm to 9 μm.

3. The composite electrode material as claimed in claim 1, wherein the core is not coated with a conductive diamond film.

4. A composite electrode, comprising:
a substrate on which an active material layer is disposed, wherein the active material layer comprises:
a composite electrode material, comprising:
a core, wherein the core is silicon flake, and a thickness of the core is in a range from 50 nm to less than 150 nm; and
a graphene nanowall;
wherein the graphene nanowall directly grows upright on a surface of the core;
and an adhesive;
wherein the graphene nanowalls each comprises a solid interior,
wherein tips of the graphene nanowalls are free standing,
wherein the graphene nanowall is characterized by a Raman spectrum exhibiting a signal strength of a 2D-band higher than a signal strength of a D-band, and a signal strength of a G-band higher than the signal strength of the 2D-band.

5. The composite electrode as claimed in claim 4, wherein the substrate is a conductive metal plate.

6. The composite electrode as claim 4, wherein the adhesive is sodium carboxymethyl cellulose (NaCMC).

7. A lithium based battery, comprising:
a composite electrode, comprising:
a substrate on which an active material layer is disposed, wherein the active material layer comprises:
a composite electrode material, comprising:
a core, wherein the core is a silicon flake, and a thickness of the core is in a range from 50 nm to less than 150 nm; and
a graphene nanowall;
wherein the graphene nanowall directly grows upright on a surface of the core;
and an adhesive;
a counter electrode made of lithium metal or a lithium containing compound;
a separator disposed between the composite electrode and the counter electrode; and
an electrolyte disposed between the composite electrode and the counter electrode and also disposed on both sides of the separator;
wherein the graphene nanowalls each comprises a solid interior,
wherein tips of the graphene nanowalls are free standing,
wherein the graphene nanowall is characterized by a Raman spectrum exhibiting a signal strength of a 2D-band higher than a signal strength of a D-band, and a signal strength of a G-band higher than the signal strength of the 2D-band.

* * * * *